US007110875B2

(12) United States Patent
Fritsch et al.

(10) Patent No.: US 7,110,875 B2
(45) Date of Patent: Sep. 19, 2006

(54) METHOD AND DEVICE FOR DETERMINING THE TEMPERATURE OF THE FUEL IN A FUEL RESERVOIR INJECTION SYSTEM

(75) Inventors: Jürgen Fritsch, Regensburg (DE); Rainer Hirn, Neutraubling (DE); Diego Valero-Bertrand, Regensburg (DE); Michael Wirkowski, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 209 days.

(21) Appl. No.: 10/923,314

(22) Filed: Aug. 20, 2004

(65) Prior Publication Data

US 2005/0049777 A1 Mar. 3, 2005

Related U.S. Application Data

(63) Continuation of application No. PCT/EP03/13381, filed on Nov. 27, 2003.

(30) Foreign Application Priority Data

Jan. 15, 2003 (DE) ................................ 103 01 264

(51) Int. Cl.
*F02D 41/00* (2006.01)
*F02D 41/40* (2006.01)
*G01F 17/00* (2006.01)

(52) U.S. Cl. ...................... 701/104; 701/114; 123/494; 73/119 A

(58) Field of Classification Search ................ 701/104, 701/103, 114, 102; 123/478, 456, 494; 73/117.3, 73/119 A, 864.28, 24.01
See application file for complete search history.

(56) References Cited

U.S. PATENT DOCUMENTS

| | | | | |
|---|---|---|---|---|
| 3,688,750 A * | 9/1972 | O'Neill | ...................... | 123/478 |
| 4,280,183 A * | 7/1981 | Santi | ......................... | 73/24.01 |
| 4,754,650 A * | 7/1988 | Smalling et al. | ......... | 73/861.28 |
| 5,988,143 A | 11/1999 | Dietz et al. | ................. | 123/458 |
| 6,138,642 A | 10/2000 | Zhang et al. | ............... | 123/478 |
| 6,539,921 B1 * | 4/2003 | Matsumura | ................ | 123/456 |

FOREIGN PATENT DOCUMENTS

| | | |
|---|---|---|
| DE | 43 43 855 A1 | 7/1995 |
| DE | 198 41 533 A1 | 3/1999 |
| EP | 0 828 070 A2 | 3/1998 |
| EP | 1 088 982 A2 | 4/2001 |

* cited by examiner

*Primary Examiner*—Hieu T. Vo
(74) *Attorney, Agent, or Firm*—Baker Botts L.L.P.

(57) ABSTRACT

In fuel reservoir injection systems also known as common rail fuel-injection systems (1) for motor vehicles the problem exists that for a defined quantity of fuel that is about to be injected it is necessary to take into account not only the predominant pressure of the fuel but also its temperature. It is difficult to install and use a temperature sensor to detect the fuel temperature. The invention therefore proposes a method and a device for determining the temperature (T) from the pressure (P) measured by the pressure sensor (4) and the sound-propagation velocity (V) of a shock wave triggered at the moment of injection.

20 Claims, 4 Drawing Sheets

T [°C]

a — -20
b — 0
c — 20
d — 40
e — 60
f — 80
g — 100
h — 120

METHOD AND DEVICE FOR DETERMINING THE TEMPERATURE OF THE FUEL IN A FUEL RESERVOIR INJECTION SYSTEM

CROSS REFERENCE TO RELATED APPLICATION

This application is a continuation of copending International Application No. PCT/EP03/13381 filed Nov. 27, 2003 which designates the United States, and claims priority to German application no. 103 01 264.8 filed Jan. 15, 2003.

TECHNICAL FIELD OF THE INVENTION

The invention provides for a method and a device for determining the temperature of fuel in a fuel reservoir injection system, in particular in the common rail injection system of a motor vehicle, in which the fuel flows via a high-pressure vessel (common rail) to connected injection valves (injectors) in the fuel-injection system, said valves being controllable by appropriate actuators, and in which the pressure of the fuel in the common rail is detected by a pressure sensor. As is already known, in a fuel reservoir injection system, which in the case of motor vehicle engines is also usually known as a common rail injection system, a fuel-injection cycle is controlled by means of the injection period, i.e. by the opening time of the injector needle in the fuel-injector, and the predominant pressure of the fuel contained in the injector or rail and about to be injected is also taken into account.

DESCRIPTION OF THE RELATED ART

With particular regard to strict requirements on emissions and in order to obtain optimum efficiency, important properties of the fuel, such as its density, viscosity, vibration behaviour etc., also have to be taken into account. Since these properties depend not only on the predominant pressure in the system, but also on the temperature of the fuel, an effort is also made to detect the temperature.

The pressure is typically measured with a pressure sensor arranged at a suitable location on the rail. Detecting the temperature is a more difficult task, however. It is technically difficult to position a temperature sensor in the high-pressure zone. In addition such a temperature sensor, which also needs a corresponding control device, is relatively expensive and therefore undesirable. It has therefore been customary either to do without installing a temperature sensor or to make use of other system components to reach a broad estimate of the fuel temperature in the high-pressure zone. These solutions are likewise considered to be unsatisfactory, since the form and timing of the progression of each fuel injection cannot be optimised by this means.

A method for determining the opening time of an injection valve in a high-pressure common rail injection system is known from patent specification DE 197 20 378 C2. In this method an engine operating map is used to derive an injection period based on a corrected statistical pressure in the high-pressure common rail system. The correction value takes into account among other things the vibration behaviour of the fuel in relation to its compressibility, the inferred quantity of fuel, or the control period from a previous injection procedure. There is also provision to take account of differences in the pressure progression, in particular with regard to the fuel temperature. It is also proposed that notice should be taken of the compressibility of the fuel, since this also affects vibration behaviour. In this case the compressibility can be detected by among other things the sound-propagation velocity. In particular, however, the method for determining the temperature of the fuel cannot be inferred from the patent specification.

SUMMARY OF THE INVENTION

The object of the invention is to determine the temperature of the fuel in a common rail fuel-injection system without using a temperature sensor. This object can be achieved by a method for determining the temperature of fuel in a fuel reservoir injection system, in particular in the common rail fuel-injection system of a motor vehicle, in which the fuel flows via a high-pressure vessel to connected injectors in the injection system, said injectors being controllable by appropriate actuators, comprising the steps of detecting the pressure of the fuel in the common rail by a pressure sensor, determining the sound-propagation velocity in respect of a shock wave in the fuel which is triggered when fuel is injected in one of the injectors and detected by the pressure sensor, and determining the temperature of the fuel with the aid of the sound-propagation velocity of the shock wave.

The sound-propagation velocity can be calculated from the transit time of the shock wave from the injector to the pressure sensor and from the path taken. The sound-propagation velocity can also be determined from the frequency of the rippling in the shock wave. The temperature of the fuel can be determined from the sound-propagation velocity taking the pressure in the common rail into account. The temperature of the fuel can also be determined with the aid of a diagram, a table, or an algorithm. At least one further parameter, preferably the density and/or the viscosity of the fuel, can be deduced from the known pressure and temperature dependency of the sound-propagation velocity. The temperature of the fuel can be used to determine the injection period of the injector.

The object can also be achieved by a device for determining the temperature of the fuel in a fuel reservoir injection system, in particular a common rail fuel-injection system, comprising a pressure sensor for detecting the pressure, a measuring device for measuring the transit time of a shock wave and a computation unit, wherein the computation unit is operable of using the transit time to determine the sound-propagation velocity and/or the temperature of the fuel. The computation unit can be controlled by a software program.

In the method and device to which the invention relates for determining the temperature of the fuel in a common rail fuel-injection system it can be advantageous to use the existing pressure sensor not only to measure the pressure in the common rail, but also to detect the shock wave triggered in the fuel by the injection procedure at an injector. It is considered to be particularly advantageous that in the first place this shock wave can be used for determining the sound-propagation velocity of the fuel. Since the sound-propagation velocity is a function of pressure and temperature, if the pressure is known the fuel temperature can be found. A separate temperature sensor is not needed, since the pressure sensor which is in any case present delivers all the required information for determining temperature.

It is considered to be especially advantageous in this connection that the sound-propagation velocity can be calculated from the transit time of the shock wave from the injector to the pressure sensor and from the path taken. It is a simple matter to measure the transit time of the shock wave, and as a result this solution is cheaper than a separate temperature sensor.

An advantageous alternative solution consists in determining the sound-propagation velocity from the frequency of the rippling in the shock wave. Rippling is the result of reflections from a standing wave, and can likewise be used to determine the sound-propagation velocity.

Since the sound-propagation velocity of the fuel is a function of the predominant pressure and temperature, if the pressure in the common rail is known together with the sound-propagation velocity, it is easy to determine the temperature of the fuel without needing a separate temperature sensor.

It is a simple matter to determine the temperature of the fuel, for instance with the aid of a diagram in which the temperature curves are plotted in relation to pressure and sound-propagation velocity.

A cost-effective alternative solution for determining the temperature comprises a table containing temperature values in relation to pressure.

As another alternative the temperature of the fuel can be determined using an algorithm containing a function which expresses the relationship of the three parameters pressure, temperature and sound-propagation velocity. Such functions are easy to program and easy for a computation unit to solve.

Since the properties of the fuel are physically linked, further parameters of the fuel can be determined when the pressure and temperature dependency of the sound-propagation velocity is known. In particular the density and/or viscosity of the fuel can be determined, for example by making a comparison, without the need for additional sensors.

When the fuel temperature has been determined, it can be used advantageously to inject an accurately metered, specified quantity of fuel, since the known and determined values can be used to correct the opening period of the injector needle in the fuel-injector, that is to say, to control the needle reliably and precisely.

In the case of the device for detecting the temperature of the fuel, it is an advantage to provide a computation unit which can be controlled by an appropriate software program. A software program is more easily adaptable to specified conditions than for example a specially tuned hardware solution. Not only can the injection system operate with great precision by this means, but it is also flexible and universally applicable.

BRIEF DESCRIPTION OF THE DRAWINGS

A typical embodiment of the invention is shown in the drawing and will be explained in greater detail in the description which follows.

DETAILED DESCRIPTION OF THE PREFERRED EMBODIMENTS

Figure 1:
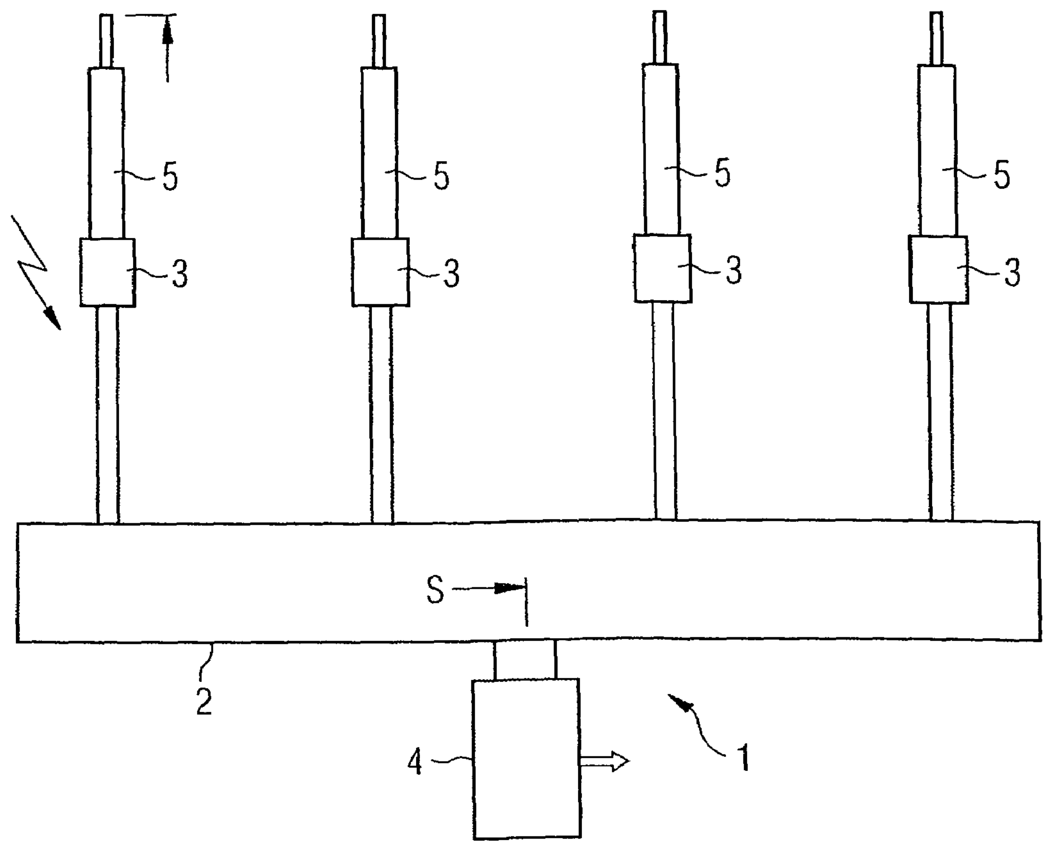
FIG. 1 shows a diagram of a common rail fuel-reservoir-injection system with four injectors.

FIG. 1 is a diagram of a common rail fuel-injection system 1 such as can be used in for example a four-cylinder diesel engine. In particular it has a high-pressure vessel known as a common rail 2 containing fuel (in this case diesel fuel) under very high pressure. The high pressure is created by a fuel pump and a control loop which have been omitted from FIG. 1 for the sake of clarity. It is important that the pressure in the rail 2 is detected by a pressure sensor 4. The pressure sensor 4 delivers a signal to a control circuit which re-adjusts the pressure in the rail 2 according to the specified conditions.

Four injection valves or injectors 5 are connected output side, and at the end of each injector is an injector needle through which when the injector 5 is actuated the fuel can escape and be injected into the combustion chamber in the engine. The injectors 5 are operated by actuators 3 which typically work on the piezoelectric principle and extend reversibly in the longitudinal axis of the injector 5 when an electrical voltage pulse is applied.

The lightning symbol on the left-hand injector 5 in FIG. 1 is intended to show that the actuator 3 for this injector 5 is being activated. This results in a fuel-pressure drop within the injector 5, triggering a shock wave (or a plurality of these) which then travels towards the pressure sensor 4. The shock wave travels from the injector 5 to the pressure sensor 4 along the path s, the length of which is known, and arrives at the pressure sensor 4 after a certain delay (transit time). The transit time of the shock wave is mainly dependent, among other parameters, on the pressure in the injection system 1 and the temperature of the fuel. The shock wave is detected by the pressure sensor 4 which forwards the measured value to a corresponding evaluation device for processing (see arrow). In addition a measuring device detects the transit time of the shock wave, as will be explained in greater detail below. This procedure will first be explained in relation to the diagram in FIG. 2.

Figure 2:
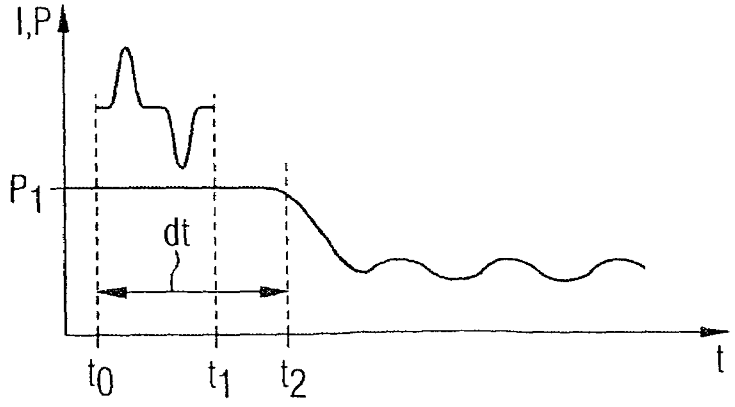
FIG. 2 shows a diagram illustrating the principle of the formation of a shock wave.

In the diagram in FIG. 2 the lower plot illustrates how the pressure P of a shock wave broadly progresses in the course of the transit time t. The upper curve shows by way of comparison a plot with a control current pulse such as is typically used to activate the piezoelectric actuator 3. In the non-activated state the static pressure value P1 is applied within the rail 2. At instant t0 the control pulse for the actuator 3 is switched on, detectable by the positive half-wave of the current impulse. By instant t1 the control pulse has been switched off. In the meantime the injector needle in the injector 5 has been opened and the fuel has been injected, and as a result the shock wave shown in the lower plot has been formed. After a shock wave transit time dt=t2−t0 the shock wave is detected by the pressure sensor 4 due to the start of the pressure drop. The transit time dt and the known length of the path s from the injector 5 to the pressure sensor 4 according to FIG. 1 are then used to determine the sound-propagation velocity in relation to the pressure P and temperature T of the fuel.

The pressure plot also shows that a standing wave forms in the right-hand part, and the frequency of this wave can be measured. This standing wave can be used as an alternative way of determining the sound-propagation velocity.

Figure 3:
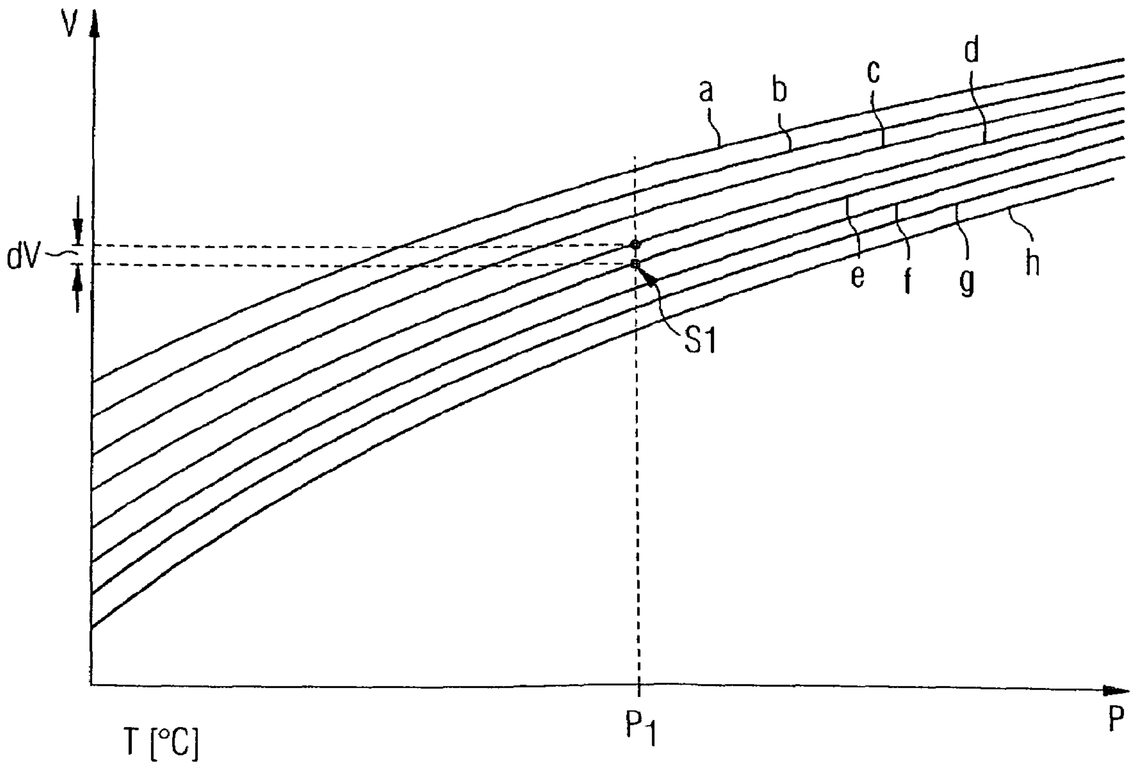
FIG. 3 shows a diagram with a plot of a current for controlling a piezoelectric actuator.
Figure 4:
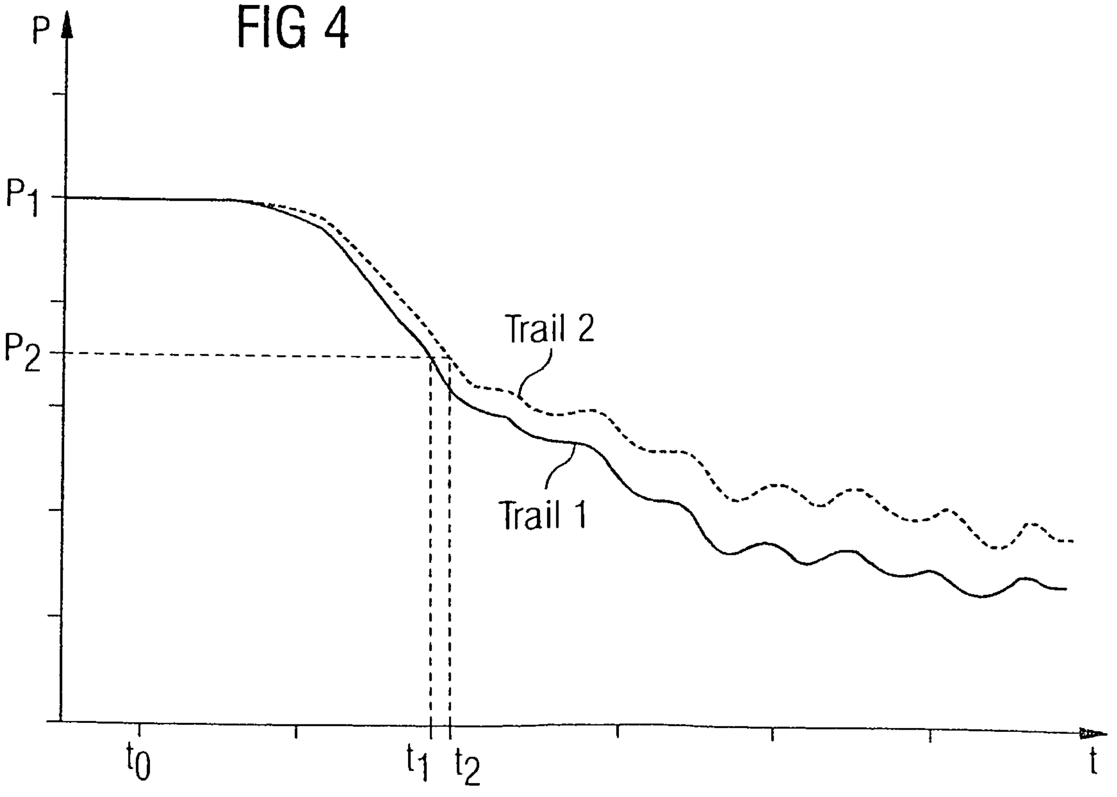
FIG. 4 shows a diagram as in FIG. 3 including two temperature plots.

FIGS. 3 and 4 explain the temperature dependency of the shock wave with the aid of the two temperatures 40° C. and 60° C. FIG. 3 again shows the plot of the control current for the actuator 3, as already explained in FIG. 2. In this case only one injection pulse has been illustrated. In practice a control cycle usually consists of a sequence of injection pulses which are switched in a brief time interval.

FIG. 4 shows both shock waves for both the temperatures $T_{rail1}$=40° C. (solid line) and $T_{rail2}$=60° C. (dotted line) as measured by the pressure sensor 4. As can be seen from FIG. 4, the plot $T_{rail2}$ has a longer transit time t2 than the plot $T_{rail1}$. A simple evaluation for determining the temperature can take the form of starting from a pressure value P1 after which the transit time of the shock wave is detected by the measuring device at the onset of a lower pressure value P2. The difference between the two transit times t2−t1 is then a measure of the fuel temperature, in relation to a reference value. As previously explained, the transit time t of the shock wave and the known length of the path s can be used to calculate the sound-propagation velocity V of the fuel according to the formula V=s/t.

An alternative calculation for the sound-propagation velocity V is also available from the rippling of the standing wave, as can be seen from the two plots in FIG. 4. On closer examination the two curves $T_{rail1}$ and $T_{rail2}$ have a somewhat different periodic time. The periodic time is mathematically in inverse proportion to the frequency and is therefore also a measure of the sound-propagation velocity V of the fuel.

Figure 5:
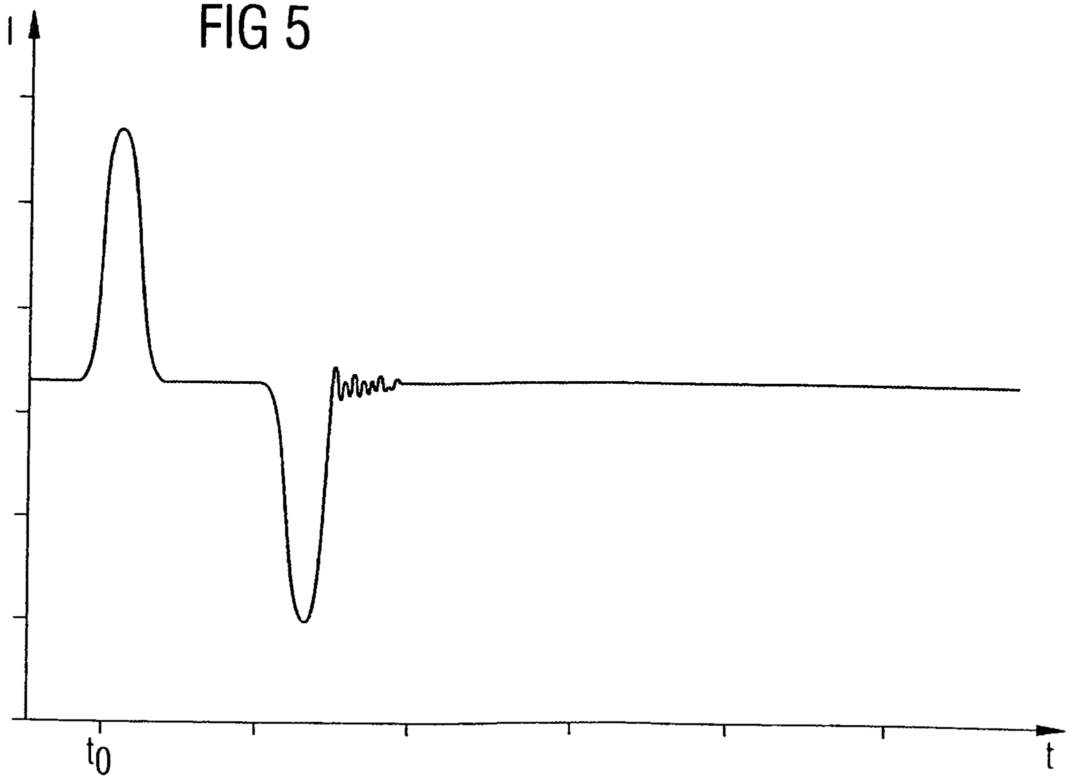
FIG. 5 shows a further diagram in which the temperature plots are shown relative to the sound-propagation velocity and the pressure.

FIG. 5 will now be used to explain how the fuel temperature can be determined from the sound-propagation velocity.

In the diagram in FIG. 5 the sound-propagation velocity V is plotted on the Y axis and the pressure P is plotted on the X axis. The curves a to h are temperature plots such as can be measured by for example empirical measurements in relation to the sound-propagation velocity V and the pressure P.

These curves express the physical correlation between the parameters of the fuel and allow still further temperature-dependent parameters such as the density and/or viscosity of the fuel to be determined. Thus different fuel types with comparable pressure and temperature readings but in which different sound-propagation velocities have been measured can easily be distinguished by a simple process of comparison.

The temperature plots a to h were determined using in each case a 20° C. temperature difference in the temperature range −20° C. to +120° C. Curve a was determined at −20° C., curve b at 0° C., curve c at +20° C. and so on and curve h was determined at +120° C. These temperature plots are used as reference curves in order to determine the temperature the fuel.

As explained in the example in FIG. 4, a transit time difference t2−t1 is obtained and this is converted into a difference dV in the sound-propagation velocity V. It is assumed that the plot $T_{rail2}$=60° C. (FIG. 4) is the applicable reference curve and from this the transit time difference t2−t1 has been calculated for plot $T_{rail1}$ and/or the difference dV for the sound-propagation velocity V has been calculated. At the given pressure value P1 in FIG. 5 one then looks for the intercept point S1 with the temperature plot e, which is known to be the reference curve at 60° C., in order to keep to the pre-specified example. At this intercept point S1 the value for the difference dV in the sound-propagation velocity V determined from FIG. 4 is plotted vertically. The result is curve d, which represents the 40° C. plot. The temperature of the fuel is therefore 40° C. in our example. Intermediate values can of course be interpolated as appropriate.

As it turns out, it is inappropriate to determine the fuel temperature directly from FIG. 4, since in this case the influence of other parameters (density, viscosity, etc.) could falsify determination of the temperature.

In an alternative embodiment of the invention it is intended to provide the diagrams in the form of corresponding tables or as an algorithm.

Figure 6:
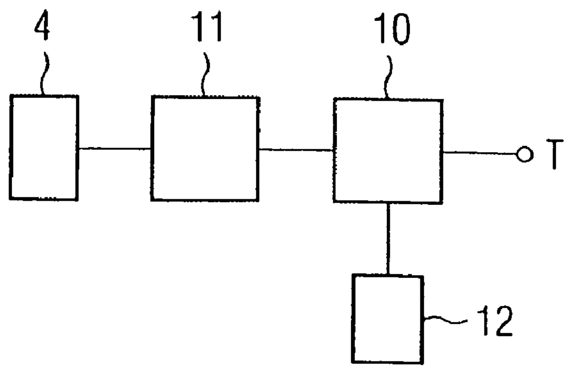
FIG. 6 shows an arrangement of circuits for determining the temperature.

FIG. 6 shows a circuit diagram for a device that has a computer-controlled measuring device 11 which can be used to determine both the transit time measurement dt and the sound-propagation velocity V of the fuel. The measuring device 11 is connected to the pressure sensor 4, from which it receives the shock wave signal. The measuring device 11 is connected output side to a computation unit 10 which is provided with a memory 12 and all other necessary units. The computation unit 10 is controlled by a software program stored in the memory 12. It is advantageous to use an existing computation unit 10 and memory 12 for this purpose in order to reduce the cost. The fuel temperature result at output T of the computation unit 10 is then available for another use, in particular for controlling the injection period.

Figure 7:
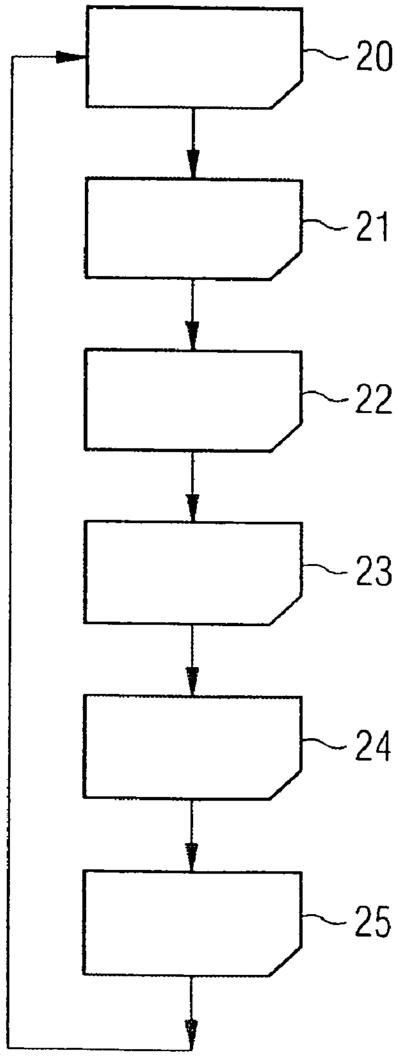
FIG. 7 shows a flow chart for a software program.

FIG. 7 shows a flow chart for a software program to control the computation unit 10. After starting the program in line 20 the static pressure value P1 is first saved to the memory 12 (line 21). In line 22 the transit time measurement t or the difference dt is determined. In line 23 the values determined are converted into the sound-propagation velocity V or the velocity difference dV. The temperature determination T is then carried out in line 24 and the result is output in line 25. If necessary the program can jump back to line 20 and a new cycle can be started.

We claim:

1. An arrangement for determining the temperature of fuel in a fuel reservoir injection system, in particular in the common rail fuel-injection system of a motor vehicle, in which the fuel flows via a high-pressure vessel to connected injectors in the injection system, said injectors being controllable by appropriate actuators, comprising:

a pressure sensor for detecting the pressure of the fuel in the common rail, means for determining the sound-propagation velocity in respect of a shock wave in the fuel which is triggered when fuel is injected in one of the injectors and detected by the pressure sensor, and means for determining the temperature of the fuel with the aid of the sound-propagation velocity of the shock wave.

2. The arrangement according to claim 1, wherein the sound-propagation velocity is calculated from the transit time of the shock wave from the injector to the pressure sensor and from the path taken.

3. The arrangement according to claim 1, wherein the sound-propagation velocity is determined from the frequency of the rippling in the shock wave.

4. The arrangement according to claim 1, wherein the temperature of the fuel is determined from the sound-propagation velocity taking the pressure in the common rail into account.

5. The arrangement according to claim 1, wherein the temperature of the fuel is determined with the aid of a diagram.

6. The arrangement according to claim 1, wherein the temperature of the fuel is determined with the aid of a table.

7. The arrangement according to claim 1, wherein the temperature of the fuel is determined with the aid of an algorithm.

8. The arrangement according to claim 1, wherein at least one further parameter, preferably the density and/or the viscosity of the fuel, is deduced from the known pressure and temperature dependency of the sound-propagation velocity.

9. The arrangement according to claim 1, wherein the temperature of the fuel is used to determine the injection period of the injector.

10. A device for determining the temperature of the fuel in a fuel reservoir injection system, in particular a common rail fuel-injection system, comprising a pressure sensor for detecting the pressure, a measuring device for measuring the transit time of a shock wave and a computation unit, wherein the computation unit is operable of using the transit time to determine the sound-propagation velocity and/or the temperature of the fuel.

11. The device according to claim 10, wherein the computation unit can be controlled by a software program.

12. A method for determining the temperature of fuel in a fuel reservoir injection system, in particular in the common rail fuel-injection system of a motor vehicle, in which the fuel flows via a high-pressure vessel to connected injectors in the injection system, said injectors being controllable by appropriate actuators, comprising the steps of:

detecting the pressure of the fuel in the common rail by a pressure sensor, determining the sound-propagation velocity in respect of a shock wave in the fuel which is triggered when fuel is injected in one of the injectors and detected by the pressure sensor, and determining the temperature of the fuel with the aid of the sound-propagation velocity of the shock wave.

13. The method according to claim 12, wherein the sound-propagation velocity is calculated from the transit time of the shock wave from the injector to the pressure sensor and from the path taken.

14. The method according to claim 12, wherein the sound-propagation velocity is determined from the frequency of the rippling in the shock wave.

15. The method according to claim 12, wherein the temperature of the fuel is determined from the sound-propagation velocity taking the pressure in the common rail into account.

16. The method according to claim 12, wherein the temperature of the fuel is determined with the aid of a diagram.

17. The method according to claim 12, wherein the temperature of the fuel is determined with the aid of a table.

18. The method according to claim 12, wherein the temperature of the fuel is determined with the aid of an algorithm.

19. The method according to claim 12, wherein at least one further parameter, preferably the density and/or the viscosity of the fuel, is deduced from the known pressure and temperature dependency of the sound-propagation velocity.

20. The method according to claim 12, wherein the temperature of the fuel is used to determine the injection period of the injector.

* * * * *